*US008935051B2*

United States Patent
Kim

(10) Patent No.: US 8,935,051 B2
(45) Date of Patent: Jan. 13, 2015

(54) SYSTEM AND METHOD FOR IMPROVING STEERING FEELING IN NEUTRAL GEAR POSITION OF VEHICLE

(71) Applicant: Hyundai Motor Company, Seoul (KR)

(72) Inventor: Jin Han Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 11 days.

(21) Appl. No.: 13/796,590

(22) Filed: Mar. 12, 2013

(65) Prior Publication Data

US 2014/0163823 A1      Jun. 12, 2014

(30) Foreign Application Priority Data

Dec. 12, 2012  (KR) .................. 10-2012-0144404

(51) Int. Cl.
*B60W 10/20* (2006.01)
*B60W 10/06* (2006.01)

(52) U.S. Cl.
CPC ............... *B60W 10/20* (2013.01); *B60W 10/06* (2013.01)
USPC ............... 701/43; 701/41; 180/400; 180/410; 180/412; 180/416

(58) Field of Classification Search
CPC ........ F16H 59/00; B62D 5/00; B62D 5/0457; B62D 6/00
USPC ........... 701/36, 41–44, 51, 53, 62, 70, 94, 99, 701/103–105, 110; 180/6.2, 6.44, 6.62, 180/65.29, 65.26, 65.27, 65.265, 337, 338, 180/400, 405–407, 410–449; 477/91, 97, 477/116, 125
See application file for complete search history.

(56) References Cited

U.S. PATENT DOCUMENTS 6,542,804 B2 *  4/2003  Muratomi ..................... 701/62
6,598,698 B2 *  7/2003  Murata et al. ............... 180/443

(Continued)

FOREIGN PATENT DOCUMENTS

KR  10-1999-0068701    9/1999
KR  10-2003-0087701   11/2003

(Continued)

OTHER PUBLICATIONS

Mustafa Abdul-Rasool, "The Impact of Ecoroll on Fuel Consumption—Using Look Ahead," Jun. 2011, KTH Electrical Engineering, pp. 1-77.*

*Primary Examiner* — Thomas Tarcza
*Assistant Examiner* — Tyler J Lee
(74) *Attorney, Agent, or Firm* — Edwards Wildman Palmer LLP; Peter F. Corless

(57) ABSTRACT

Disclosed herein is a system and method for improving a steering feeling of a driver while preventing a heavy feeling of a steering wheel or a kickback phenomenon during an eco-roll operation for improving a fuel ratio of the vehicle. The method includes determining, by a controller, an eco-roll operation condition in which a brake is disengaged, an accelerator pedal is disengaged, and a speed of the vehicle is a reference speed or higher. Furthermore, when the eco-roll operation condition is determined, the controller coverts a gear state of a transmission into a neutral gear state. The controller also controls an engine RPM to an idle RPM to start the eco-roll mode and an operation of an emergency steering system to assist steering power according to a steering input due to a driver manipulation of a steering wheel while the traveling in a neutral gear state of an eco-roll mode.

9 Claims, 6 Drawing Sheets

(56) References Cited

U.S. PATENT DOCUMENTS

| | | | |
|---|---|---|---|
| 7,212,896 B2 * | 5/2007 | Coelingh et al. | 701/48 |
| 7,337,049 B2 * | 2/2008 | Sakakibara et al. | 701/48 |
| 7,509,202 B2 * | 3/2009 | Scelers | 701/65 |
| 8,527,163 B2 * | 9/2013 | Staudinger et al. | 701/51 |
| 2006/0041360 A1 * | 2/2006 | Post, II | 701/48 |
| 2006/0293822 A1 * | 12/2006 | Lattemann et al. | 701/51 |

FOREIGN PATENT DOCUMENTS

| | | |
|---|---|---|
| KR | 10-0542607 | 1/2006 |
| KR | 10-2010-0062804 | 6/2010 |

* cited by examiner (a) According to the related art (b) Present invention

SYSTEM AND METHOD FOR IMPROVING STEERING FEELING IN NEUTRAL GEAR POSITION OF VEHICLE

CROSS-REFERENCE TO RELATED APPLICATION

This application claims under 35 U.S.C. §119(a) the benefit of Korean Patent Application No. 10-2012-0144404 filed Dec. 12, 2012, the entire contents of which are incorporated herein by reference.

BACKGROUND (a) Technical Field

The present invention relates to a system and method for improving a steering feeling in a neutral gear position of a vehicle, and more particularly, to a method for improving a steering feeling of a vehicle when the vehicle travels in a neutral gear mode through an operation of an eco-roll system.

(b) Background Art

In general, a vehicle includes power steering apparatuses for reducing a steering power of a driver during a steering operation. The power steering apparatuses include hydraulic power steering apparatuses for assisting a steering power using a hydraulic pressure formed by a hydraulic pump, and electric power steering apparatuses for assisting a steering power using a driving torque (e.g., rotating power) of an electric motor.

Moreover, the hydraulic steering apparatuses using a hydraulic pump (e.g., power steering pump) are widely used in commercial vehicles such as large-sized vehicle, and the hydraulic pump receives a rotating power of an engine to be driven. Furthermore, as a system mainly applied to a commercial vehicle, an eco-roll system is operated when a driver disengages an accelerator pedal while the vehicle travels at a predetermined speed (i.e., 50 km/h) or higher.

FIG. 1 is an exemplary view showing an operation condition of an eco-roll system. The eco-roll system is a system in which a control unit is configured to automatically change a gear state of a transmission into a neutral (N) gear while the gears of the transmission are engaged without a separate driver manipulation when a speed of the vehicle is a predetermined speed or higher during a downhill travel of the vehicle.

After conversion into a neutral gear state, as shown in FIG. 2, the eco-roll system lowers an engine RPM to an idle state, and an inertial travel is made by the inertia of the vehicle in an idle state, thereby improving a fuel ratio of the vehicle (e.g., the fuel ratio is improved by reducing a rolling resistance of the vehicle).

Referring to FIG. 1, when an accelerator pedal is disengaged for a predetermined time or longer at a predetermined speed or higher, an eco-roll mode is performed. Referring to FIG. 2, an idle RPM is maintained at the same time when the gear of the vehicle is converted into a neutral gear state during an operation of the eco-roll mode.

However, when an eco-roll mode for improving fuel ratio is operated, an engine RPM is lowered to an idle state, and an output of a power steering pump that receives a rotating power of an engine to be driven is also lowered at the same time. Accordingly, a driver needs to apply a stronger force to manipulate steering power, and may experience a sudden heavy feeling of a steering wheel or a kickback phenomenon.

SUMMARY

The present invention provides a system and method for improving a steering feeling of a driver while preventing a heavy feeling of a steering wheel or a kickback phenomenon during an eco-roll operation for improving a fuel ratio of the vehicle.

One embodiment of the present invention provides a method for improving a steering feeling while a vehicle travels in a neutral gear state of an eco-roll mode, the method including: determining an eco-roll operation condition in which a brake is disengaged, an accelerator pedal is disengaged, and a speed of the vehicle is a reference speed or higher; when the eco-roll operation condition is detected, converting a gear state of a transmission into a neutral gear state, and controlling an engine RPM to an idle RPM to start the eco-roll mode; and controlling an operation of an emergency steering system to assist steering power according to a steering input due to a driver manipulation of a steering wheel while the vehicle travels in a neutral gear state of an eco-roll mode.

In an exemplary embodiment, when an incline angle of a road is within a predetermined range and the vehicle is decelerated, the eco-roll operation condition may be detected.

In another exemplary embodiment, when the driver manipulates an operation switch to operate the eco-roll mode, the above steps may be performed.

Thus, according to the method for improving a steering feeling of the present invention, steering power may be assisted by an operation of an emergency steering system while a vehicle travels in a neutral gear state after an eco-roll mode for improving a fuel ratio of the vehicle starts, and thus a heavy feeling of a steering wheel or a kickback phenomenon according to the related art may be decreased and a steering feeling felt by the driver may be improved.

BRIEF DESCRIPTION OF THE DRAWINGS

The above and other features of the present invention will now be described in detail with reference to exemplary embodiments thereof illustrated the accompanying drawings which are given hereinbelow by way of illustration only, and are thus not limitative of the present invention, and wherein.

Figure 1:
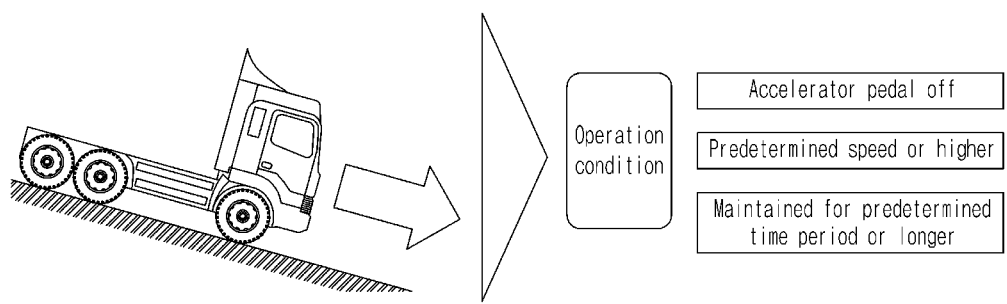
FIG. 1 is an exemplary view showing an operation condition of a general eco-roll system according to prior art.
Figure 2:
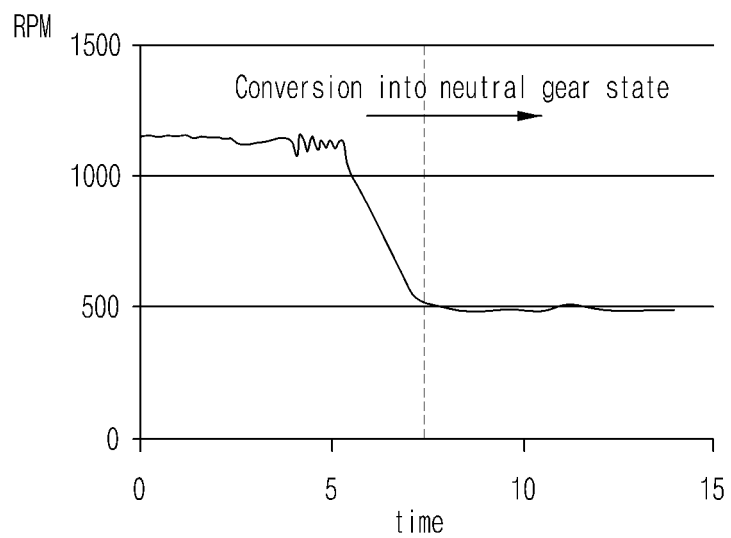
FIG. 2 is an exemplary view showing an engine RPM control state during an operation of an eco-roll system according to the prior art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present invention, examples of which are illustrated in the accompanying drawings and described below.

Hereinafter, exemplary embodiments of the present invention will be described in detail with reference to the accompanying drawings so that those skilled in the art to which the present invention pertains can easily carry out the invention.

The present invention provides a method of improving a steering feeling when a driver performs a steering operation of a vehicle when the vehicle travels in an eco-roll mode, that is, an eco-roll operation condition to travel in a neutral gear state or an engine idle state, by assisting a steering power of the driver using an emergency steering system (ESS). The emergency steering system is an auxiliary power steering system capable of assisting a steering power of a driver when an engine or a power steering pump fails, and may be mounted to a part other than an engine of a two-axle vehicle.

Figure 3:
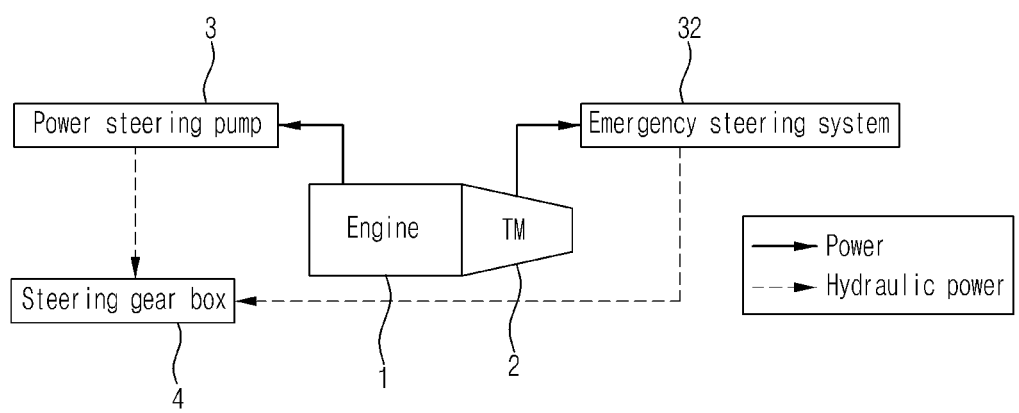
FIG. 3 is an exemplary view showing an emergency steering system mounted to a vehicle according to an exemplary embodiment of the present invention.

FIG. 3 is an exemplary view showing an emergency steering system mounted to a vehicle. As shown in FIG. 1, the emergency steering system 32 may receive a rotating power output from a transmission 2, and includes a hydraulic pump configured to generate a hydraulic pressure for assisting a steering power with a rotating power of the transmission 3. However, the present invention the steering power may be assisted without the loss of vehicle power when an electrical emergency steering system is used.

When an engine used during vehicle travel or a power steering pump 3 used normally fails, a power steering oil pressure supplied to a steering gearbox 4 may not be generated, thus the power steering apparatus may not assist a steering power of a driver. Furthermore, since the transmission 2 may rotate when the engine 1 is stopped during vehicle travel, the emergency steering apparatus 32 may drive the pump using a rotating power of the transmission to assist the steering power.

Accordingly, the present invention may change logic such that the emergency steering apparatus mounted to a vehicle may be operated when an engine or a power steering pump fails and may be operated when an eco-roll mode starts, and may allow the emergency system to assist a steering power of the driver in the eco-roll mode in which the vehicle travels in a neutral gear state, thereby improving a steering feeling.

Figure 4:
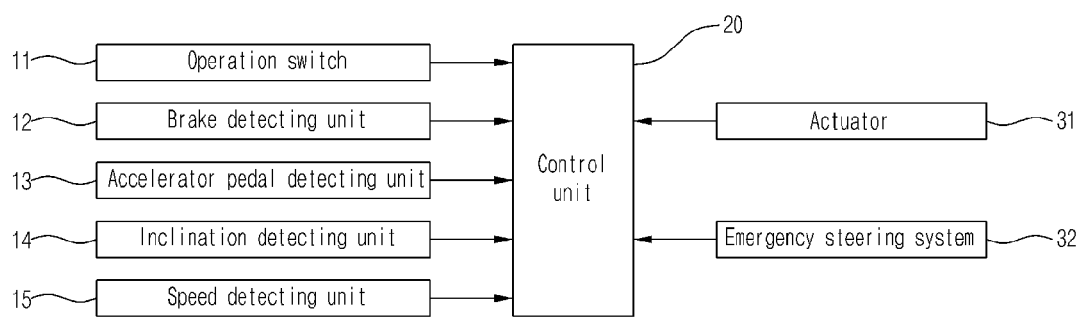
FIG. 4 is an exemplary diagram of a system for carrying out a method according to an exemplary embodiment of the present invention.

First, FIG. 4 is an exemplary diagram of a system for improving the steering feeling while traveling in a neutral gear state of an eco-roll mode according to the present invention. The system may include an operation switch 11, an actuator 31, an emergency steering system 32, and a plurality of units executed by one or more controllers 20 having at least a processor and a memory, wherein the controller may be an engine control unit, a main controller, or the like. The plurality of units include a brake detecting unit 12, an accelerator pedal detecting unit 13, an inclined angle detecting unit 14, and a speed detecting unit 15.

Moreover, the operation switch 11 may be a switch manipulated by a driver to operate an eco-roll mode, the brake detecting unit 12 may be configured to detect a brake pedal input (e.g., pedal manipulation state) of the driver, and the accelerator pedal detecting unit 13 may be configured to detect an accelerator pedal input of the driver.

In a general vehicle, the brake detecting unit may be configured to detect pedal displacement (e.g., stroke amount) information, a stepping force, a pedal off state (e.g., pedal pressure released state), and the like, and the accelerator pedal detecting unit may be configured to detect pedal displacement information, a pedal off state (e.g., pedal pressure released state), and the like.

The inclined angle detecting unit 14 may be configured to detect an incline angle of a road, and the speed detecting unit 15 may be configured to detect a current vehicle speed.

After detecting an eco-roll operation condition when a driver manipulates the operation switch, (i.e., in an ON state of the operator switch 11) the eco-roll operation may be enabled and the controller 20 may convert a gear of the transmission into a neutral gear and may control the engine to an idle state.

Furthermore, the controller 20 may include an engine control unit for controlling the engine, and a transmission control unit for controlling power transmission, or may be a single control unit in which the functions are integrated.

Further, when an eco-roll operation is detected, the controller 20 may operate the emergency steering system 32 to assist a steering power when the driver desires to perform a steering operation, thereby improving a steering feeling felt by the driver.

The actuator 31 may be configured to convert the gear of the transmission into a neutral gear state in response to a control signal of the controller 20, and may be a general actuator for operating a coupling element and a releasing element of the transmission. The actuator 31 may be a solenoid valve for controlling a hydraulic pressure for operating a coupling element and a releasing element.

Figure 5:
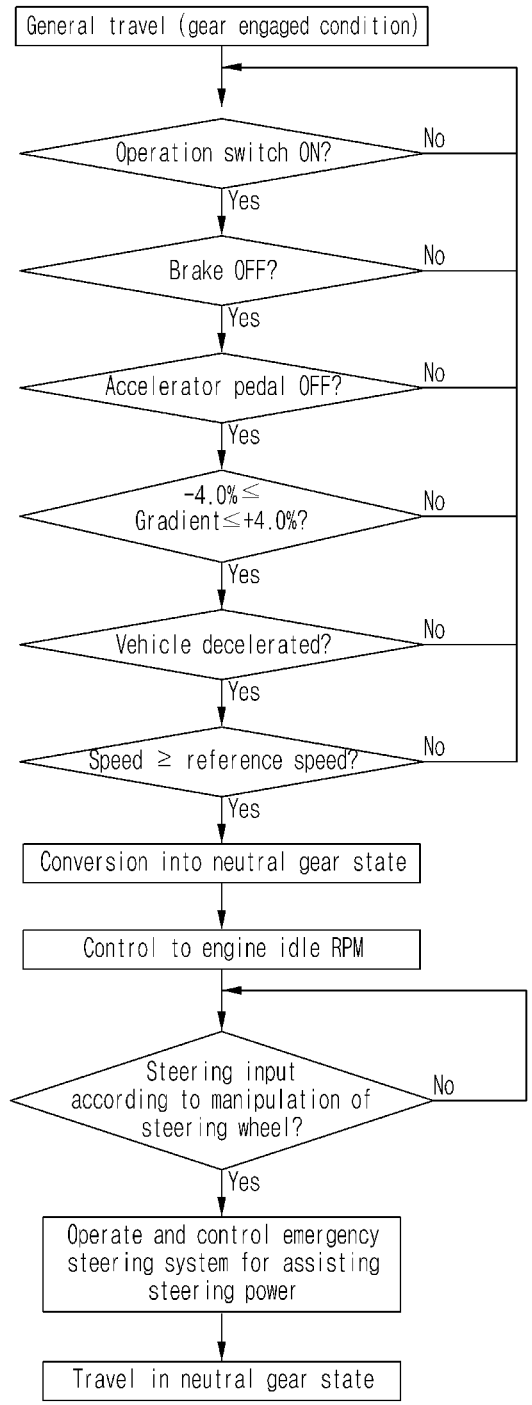
FIG. 5 is an exemplary flowchart showing a method for improving a steering feeling according to an exemplary embodiment of the present invention.

Hereinafter, a method for improving a steering feeling according to the present invention will be described in detail with reference to FIG. 5.

According to the present invention, operation logic may be altered to allow an emergency steering system (e.g., operated when an engine or a power steering pump fails according to the related art) to be operated to assist a steering power while a transmission gear of a vehicle is converted into a neutral gear state in an eco-roll mode and a driver performs a steering operator after an engine RPM is lowered to an idle RPM.

First, a vehicle generally travels in a gear engaged condition of a transmission, and when an a driver turns on an operation switch, the controller may determine whether the current condition corresponds to an eco-roll operation condition from vehicle driving information and travel information.

Here, the driving information may be engaged or disengaged information of a brake pedal and an accelerator pedal provided by the brake detecting unit and the accelerator pedal detecting unit. The vehicle travel information may include road incline information and vehicle speed information, and in a brake disengaged state and an accelerator pedal disengaged state, the control unit may detect the inclination angle from the incline information by determining whether a gradient (or incline) of a road is within a predetermined range (i.e., −4.0% to 4.0%).

When the controller determines that the gradient of the road is within a predetermined range, the controller may determine whether the current vehicle speed is a reference speed or higher, and when the current vehicle speed is the reference speed or higher, the controller may determine whether the vehicle is being decelerated. When the vehicle is being decelerated, the controller may determine that an eco-roll mode start condition is satisfied.

In the process, the gradient range (i.e., −4.0% to 4.0%) may be a value determined in advance by a gradient at which the vehicle may be decelerated. Although a vehicle may be accelerated due to inertia at a negative gradient (e.g., a downhill road gradient condition), the vehicle may be decelerated in a slight negative gradient condition, considering the weight of the vehicle and the load of the vehicle, thus a negative gradient having a lower limit may also falls within the range.

Furthermore, the lower limit of the gradient range may be set to a minimum gradient (e.g., negative value) at which the vehicle may be decelerated, considering a load of a large-sized truck, a speed limit condition, and the like. For example, when the lower limit is −4.0%, a rolling resistance in a neutral travel condition (i.e., an empty state and a neutral travel at a speed of 100 km/h) of the vehicle is higher than an acceleration inertia at a gradient of −4.0% or higher, decelerating the vehicle Additionally, in determining the deceleration of the vehicle, the controller determine that the vehicle is decelerated when the vehicle speed is reduced after vehicle speeds collected at a predetermined time interval (i.e., 1 second) from a pedal disengaged time point are compared to the preceding speeds.

Moreover, the controller may determine that the eco-roll mode start conditions are satisfied in a vehicle deceleration state, may control the actuator to convert the gear of the transmission into a neutral state, and may control an engine RPM to an idle RPM.

Since the engine may be controlled to a fuel cut state when the vehicle is accelerated (e.g., the vehicle speed is increased) in a gear engaged condition of the transmission, a fuel is not injected, and when the gear is converted into a neutral state, the fuel may be consumed despite an inertial performance of the vehicle due to an acceleration being sufficient.

Thus, when the vehicle is decelerated, the gear may be converted into a neutral state, and when the gear is converted into a neutral state when the vehicle is decelerated in a gear engaged condition, an inertial capacity of the vehicle may be maximized and accordingly, a fuel ratio of the vehicle may increase.

In addition, when a steering operation is performed by the driver while the vehicle travels in a neutral gear state, that is, the steering wheel is operated, the controller may operate and control the emergency steering system corresponding to a steering input according to a driver manipulation of the steering wheel to allow the emergency steering system to assist the steering power of the driver.

In this way, the vehicle may travel in a neutral gear state while the engine is idling until the eco-roll operation condition is released, and steering power may be assisted by an operation of the emergency steering system when a steering operation is performed by the driver while the vehicle travels in a neutral gear state. Thus, a heavy feeling of a steering wheel or a kickback phenomenon according to the related art may be decreased and a steering feeling felt by the driver may be improved.

Further, when the vehicle is decelerated in a gear engaged condition, an inertial performance of the vehicle may be maximized by converting the gear into a neutral state, and accordingly, a fuel ratio of the vehicle may increase.

Figure 6:
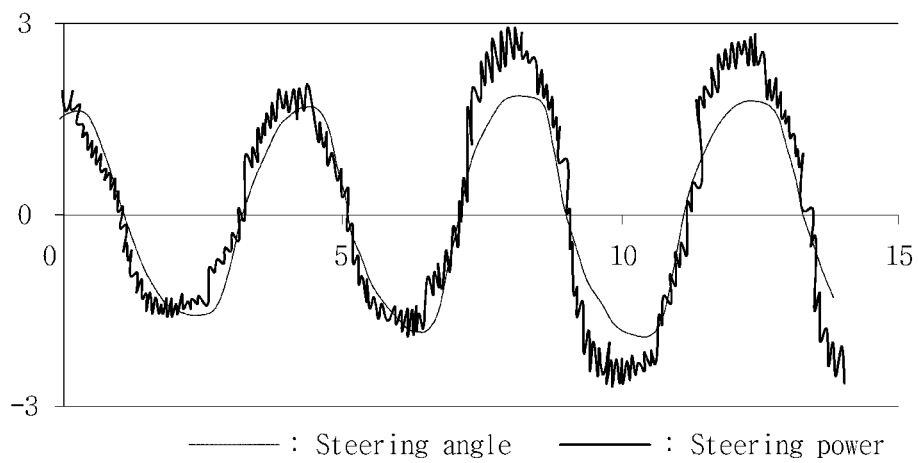
FIGS. 6A and 6B are exemplary views showing an improved steering feeling according to an exemplary embodiment of the present invention.
Figure 6:
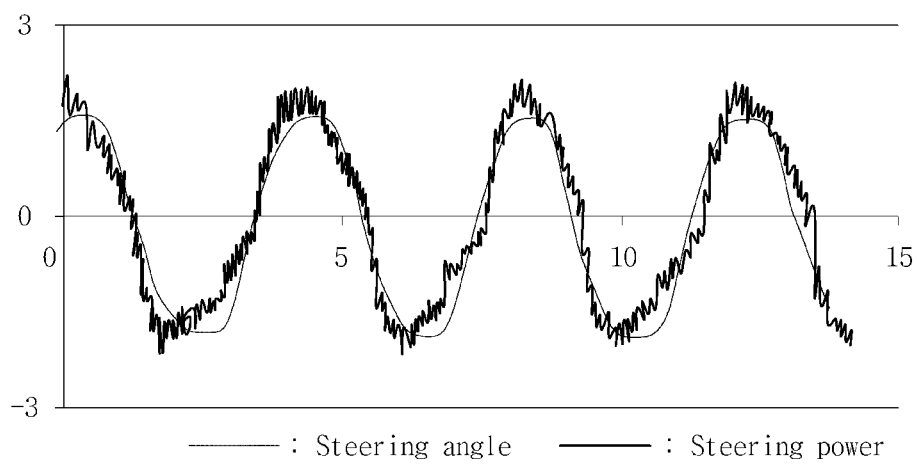

FIG. 6 is an exemplary view showing an improved steering feeling according to the present invention, and is an exemplary view obtained by comparing steering powers when the same steering angle is input according to the related art and the present invention, respectively.

As shown in FIG. 6, a force applied by the driver to manipulate the steering power during an eco-roll operation is relatively large and the steering wheel is heavy according to the related art. However, steering power may be manipulated by a smaller force by allowing a driving force of the emergency steering system to assist a steering power of the driver according to the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for improving a steering feeling while traveling in a neutral gear state of an eco-roll mode, the method comprising:
   determining, by one or more controllers, an eco-roll operation condition in which a brake is disengaged, an accelerator pedal is disengaged, and a speed of the vehicle is a reference speed or higher;
   in response to determining the eco-roll operation condition, converting, by the one or controllers, a gear state of a transmission into a neutral gear state;
   controlling, by the one or more controllers, an engine revolution per minute (RPM) to an idle RPM to start the eco-roll operation mode; and
   controlling, by the one or more controllers, an operation of an emergency steering system to assist steering power according to a steering input due to a driver manipulation of a steering wheel while the vehicle travels in a neutral gear state of an eco-roll mode,
   wherein the emergency steering system is capable of operating when the engine RPM of the vehicle is lowered to an idle state.

2. The method of claim 1, wherein the eco-roll operation condition may be satisfied when a gradient of a road is within a predetermined range and the vehicle is decelerated.

3. The method of claim 1, further comprising:
   determining, by the one or more controllers, the eco-roll operation mode when the driver manipulates the operation switch.

4. A system for improving a steering feeling while traveling in a neutral state of an eco-roll mode, the system comprising:
   an operation switch; and
   one or more controllers configured to:
   determine an eco-roll operation condition in which a brake is disengaged, an accelerator pedal is disengaged, and a speed of the vehicle is a reference speed or higher;
   convert a gear state of a transmission into a neutral gear state, in response to determining the eco-roll operation condition;
   control an engine revolution per minute (RPM) to an idle RPM to start the eco-roll operation mode; and
   control an operation of an emergency steering system to assist steering power according to a steering input due to a driver manipulation of a steering wheel while the vehicle travels in a neutral gear state of an eco-roll mode,
   wherein the emergency steering system is capable of operating when the engine RPM of the vehicle is lowered to an idle state.

5. The system of claim 4, wherein the eco-roll operation condition may be satisfied when a gradient of a road is within a predetermined range and the vehicle is decelerated.

6. The system of claim 4, wherein the one or more controllers may be further configured to determine the eco-roll operation mode when the driver manipulates the operation switch.

7. A non-transitory computer readable medium containing program instructions executed by a processor or controller, the computer readable medium comprising:
   program instructions that determine an eco-roll operation condition in which a brake is disengaged, an accelerator pedal is disengaged, and a speed of the vehicle is a reference speed or higher;
   program instructions that convert a gear state of a transmission into a neutral gear state, in response to determining the eco-roll operation condition;
   program instructions that control an engine revolution per minute (RPM) to an idle RPM to start the eco-roll operation mode; and
   program instructions that control an operation of an emergency steering system to assist steering power according to a steering input due to a driver manipulation of a steering wheel while the vehicle travels in a neutral gear state of an eco-roll mode,
   wherein the emergency steering system is capable of operating when the engine RPM of the vehicle is lowered to an idle state.

8. The non-transitory computer readable medium of claim 7, wherein the eco-roll operation condition may be satisfied when a gradient of a road is within a predetermined range and the vehicle is decelerated.

9. The non-transitory computer readable medium of claim 7, further comprising:
   program instructions that determine the eco-roll operation mode when the driver manipulates the operation switch.

* * * * *